(12) United States Patent
Venkataraman et al.

(10) Patent No.: US 10,382,341 B2
(45) Date of Patent: Aug. 13, 2019

(54) LABEL SWITCHED PATH PREEMPTION AVOIDANCE

(71) Applicant: Juniper Networks, Inc., Sunnyvale, CA (US)

(72) Inventors: Sudharsana Venkataraman, Bangalore (IN); Raveendra Torvi, Nashua, NH (US); Chandrasekar Ramachandran, Bangalore (IN); Yakov Rekhter, New York, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 204 days.

(21) Appl. No.: 14/713,068

(22) Filed: May 15, 2015

(65) Prior Publication Data
US 2016/0277959 A1 Sep. 22, 2016

(30) Foreign Application Priority Data
Mar. 20, 2015 (IN) ............................ 1410/CHE/2015

(51) Int. Cl.
| | | |
|---|---|---|
| H04W 28/02 | (2009.01) | |
| H04L 12/755 | (2013.01) | |
| H04W 24/08 | (2009.01) | |
| H04L 12/851 | (2013.01) | |
| H04L 12/729 | (2013.01) | |
| H04L 12/911 | (2013.01) | |

(Continued)

(52) U.S. Cl.
CPC ........ *H04L 47/2433* (2013.01); *H04L 45/125* (2013.01); *H04L 47/2408* (2013.01); *H04L 47/72* (2013.01); *H04L 47/805* (2013.01); *H04L 45/021* (2013.01); *H04L 45/50* (2013.01)

(58) Field of Classification Search
None
See application file for complete search history.

(56) References Cited

U.S. PATENT DOCUMENTS

| 7,184,437 B1 | 2/2007 | Cole et al. |
| 8,339,939 B2 | 12/2012 | Csaszar et al. |

(Continued)

OTHER PUBLICATIONS

Andersson et al. "LDP Specification" Network Working Group, RFC 5036, Oct. 2007, 135 pgs.

(Continued)

*Primary Examiner* — Kevin C. Harper
*Assistant Examiner* — Derrick V Rose
(74) *Attorney, Agent, or Firm* — Shumaker & Sieffert, P.A.

(57) ABSTRACT

Techniques are described for establishing lower priority LSPs on paths determined to be less likely to include bandwidth constrained links. In one example, a router includes a plurality of physical interfaces each having at least one link interconnecting the router as one of a plurality of routers in a network and a processor. The processor is configured to determine whether a link of one of the plurality of physical interfaces is congested based at least in part on an amount of available bandwidth on the link, and, responsive to determining that the link is congested, set a bandwidth subscription for the link, wherein the bandwidth subscription specifies that the amount of available bandwidth on the link for label switched paths having a lower priority is less than the amount of available bandwidth on the link for label switched paths having a higher priority.

20 Claims, 5 Drawing Sheets

(51) Int. Cl.
  *H04L 12/927* (2013.01)
  *H04L 12/723* (2013.01)

(56) References Cited

U.S. PATENT DOCUMENTS

| | | | |
|---|---|---|---|
| 2006/0146696 A1* | 7/2006 | Li | H04L 41/06 370/218 |
| 2006/0250961 A1* | 11/2006 | Vasseur | H04L 12/5695 370/235 |
| 2012/0134260 A1* | 5/2012 | Chou | H04L 43/065 370/225 |
| 2012/0230185 A1* | 9/2012 | Yong | H04L 45/02 370/228 |
| 2014/0003232 A1* | 1/2014 | Guichard | H04L 67/16 370/230 |

OTHER PUBLICATIONS

Awduche et al. "RSVP-TE: Extensions to RSVP for LSP Tunnels" Network Working Group, RFC 3209, Dec. 2001, 61 pgs.
Rekhter et al. "Carrying Label Information in BGP-4" Network Working Group, RFC 3107, May 2001, 4 pgs.
Vasseur et al. "Path Computation Element (PCE) Communication Protocol (PCEP)", Network Working Group, RFC 5440, Mar. 2009, 39 pgs.

\* cited by examiner

LABEL SWITCHED PATH PREEMPTION AVOIDANCE

This application claims the benefit of India Patent Application No. 1410/CHE/2015, filed Mar. 20, 2015, the entire content of which is incorporated herein by reference.

TECHNICAL FIELD

The disclosure relates to computer networks and, more particularly, to engineering traffic flows within computer networks.

BACKGROUND

Routing devices within a network, often referred to as routers, maintain routing information that describes available routes through the network. Upon receiving an incoming packet, the router examines information within the packet and forwards the packet in accordance with the routing information. In order to maintain an accurate representation of the network, routers exchange routing information in accordance with one or more defined routing protocols, such as the Border Gateway Protocol (BGP).

Multi-Protocol Label Switching (MPLS) is a suite of protocols used to engineer traffic patterns within Internet Protocol (IP) networks. By utilizing MPLS, a source device can request a path through a network to a destination device, i.e., a Label Switched Path (LSP). An LSP defines a distinct path through the network to carry MPLS packets from the source device to a destination device. Each router along a LSP allocates a label and propagates the label to the closest upstream router along the path. Routers along the path cooperatively perform MPLS operations to forward the MPLS packets along the established path. A variety of protocols exist for establishing LSPs, such as the Label Distribution Protocol (LDP) and the Resource Reservation Protocol with Traffic Engineering extensions (RSVP-TE).

Head-end routers of an LSP are commonly known as ingress routers, while routers at the tail end of the LSP are commonly known as egress routers. Ingress and egress routers, as well as intermediate routers along the LSP that support MPLS, are referred to generally as label switching routers (LSRs). Each LSP configured between the ingress and the egress routers may be assigned a different priority (e.g., low or high priority). When a high priority LSP is being setup, if there is reservation contention on a link along the path to the destination, any low priority LSP taking the link could get preempted and eventually rerouted.

SUMMARY

In general, this disclosure describes techniques for establishing lower priority LSPs on paths determined to be less likely to include bandwidth constrained links, which may lead to preemption of the lower priority LSPs if a higher priority LSP is placed on the bandwidth constrained link. In some examples, techniques of this disclosure enable a router or path computation element (PCE) to manipulate the path selection techniques for lower priority LSPs so as to avoid links that may have less than a threshold amount of available bandwidth without altering the path selection techniques for higher priority LSPs. For example, rather than placing a lower priority LSP along a path that includes links that have sufficient bandwidth for the lower priority LSP, the ingress router may be further configured to determine if the amount of available bandwidth available for each link along a path satisfies a threshold amount of bandwidth, which is less than the total amount of bandwidth provided by each link. If the amount of available bandwidth does not satisfy the threshold amount of bandwidth (e.g., the amount of available bandwidth is less than the threshold amount, the amount of bandwidth currently used exceeds the threshold amount of bandwidth, etc.), the ingress router may select a different path for the lower priority LSP. In this way, the ingress router may be configured to implement the techniques of this disclosure without requiring modification to the other routers in the network.

As another example, each router within a network may be configured to report an amount of available bandwidth on each link attached to the respective router to a management tool. When the management tools determines that the amount of available bandwidth for a particular link drops below a threshold amount of available bandwidth, the management tool may configured the particular router such that the amount of available bandwidth for lower priority LSPs is set so as to prevent further placement of low priority LSPs on the particular link. For example, the management tool may configure the particular router to send an IGP update message indicating that, for lower priority LSPs, the amount of available bandwidth is reduced by an amount of available bandwidth (e.g., the threshold amount of available bandwidth, an amount greater than the threshold amount of available bandwidth, an amount less than the threshold amount of available bandwidth, etc.). By changing the amount of available bandwidth reported by the particular router, the ingress router will determine that there is insufficient bandwidth on the link to place a lower priority LSP and will select a different path for the lower priority LSP. In this way, each router may be configured in accordance with techniques of this disclosure without requiring modification to the ingress router.

In one example, a method comprises determining, by a router, whether a link is congested based at least in part on an amount of available bandwidth on the link, and, responsive to determining that the link is congested, setting, by the router, a bandwidth subscription for the link, wherein the bandwidth subscription specifies that the amount of available bandwidth on the link for label switched paths having priorities that satisfy a lower priority threshold is less than the amount of available bandwidth on the link for label switched paths having priorities that do not satisfy the lower priority threshold.

In another example, a router comprises a plurality of physical interfaces each having at least one link interconnecting the router as one of a plurality of routers in a network and a processor. The processor is configured to determine whether a link of a physical interface of the plurality of physical interfaces is congested based at least in part on an amount of available bandwidth on the link, and, responsive to determining that the link is congested, set a bandwidth subscription for the link, wherein the bandwidth subscription specifies that the amount of available bandwidth on the link for label switched paths having priorities that satisfy a lower priority threshold is less than the amount of available bandwidth on the link for label switched paths having priorities that do not satisfy the lower priority threshold.

In another example, a computer-readable storage device stores instructions that cause a processor to determine whether a link is congested based at least in part on an amount of available bandwidth on the link, and, responsive to determining that the link is congested, set a bandwidth subscription for the link, wherein the bandwidth subscription specifies that the amount of available bandwidth on the link for label switched paths having priorities that satisfy a lower priority threshold is less than the amount of available bandwidth on the link for label switched paths having priorities that do not satisfy the lower priority threshold.

The details of one or more embodiments are set forth in the accompanying drawings and the description below. Other features, objects, and advantages will be apparent from the description and drawings, and from the claims.

DETAILED DESCRIPTION

Figure 1A:
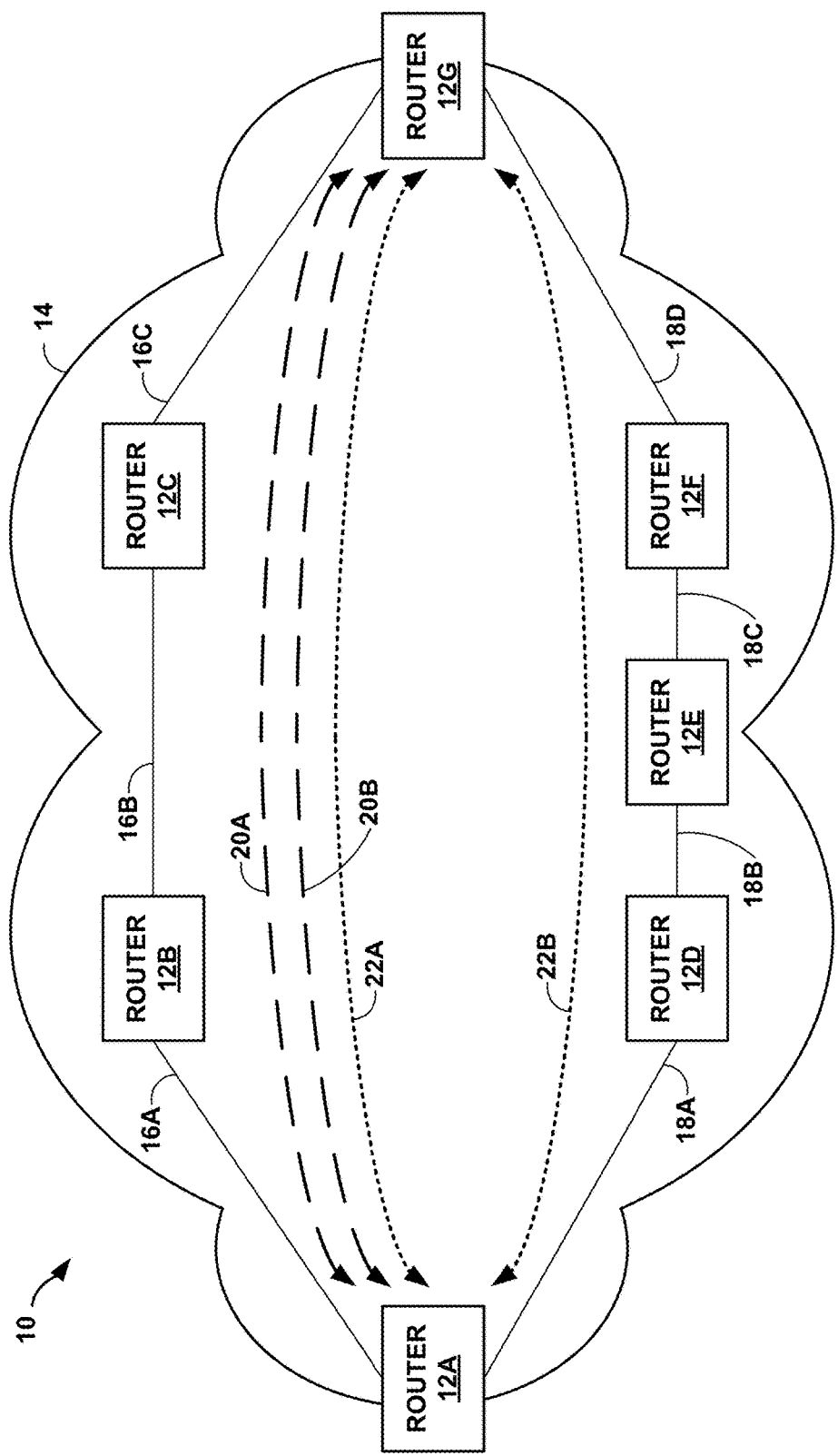
FIGS. 1A and 1B are a block diagram illustrating an example system having higher priority LSPs and lower priority LSPs configured between an ingress router and an egress router, in accordance with one or more techniques of this disclosure.

FIG. 1A is a block diagram illustrating an example network system 10 having higher priority LSPs 20A and 20B ("higher priority LSPs 20") and lower priority LSPs 22A and 22B ("lower priority LSPs 22") configured between ingress router 12A and egress router 12G, in accordance with techniques described herein. In some examples, network 14 may be a service provider network. For example, network 14 may represent one or more networks owned and operated by a service provider (which is commonly a private entity) that offer one or more services for consumption by subscriber networks. In this context, network 14 is typically a layer three (L3) packet-switched network that provides L3 connectivity between a public network and one or more subscriber networks (not shown). Often, this L3 connectivity provided by a service provider network is marketed as a data service or Internet service, and subscribers may subscribe to this data service. Network 14 may represent a L3 packet-switched network that provides data, voice, television and any other type of service for purchase by subscribers and subsequent consumption by subscriber networks.

While not shown in the example of FIG. 1A, network system 10 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

As shown in FIG. 1A, routers 12 operate as label switching routers (LSRs) and utilize an MPLS protocol communicate label information so as to establish LSPs 20 and 22. For purposes of example, techniques of this disclosure are described with respect to RSVP-TE, which represents an exemplary MPLS protocol in which LSRs allocate labels and communicate label information to other LSRs. Example details of RSVP are described in Awduche, D., Berger, L., Gan, D., Li, T., Srinivasan, V., and G. Swallow, "RSVP-TE: Extensions to RSVP for LSP Tunnels", RFC 3209, December 2001, the entire contents of which is incorporated herein by reference. Other example MPLS protocols for distribution of MPLS labels include the Label Distribution Protocol (LDP) and BGP when used to distribute label mapping information. Example details of these protocols are described in Andersson, L., Ed., Minei, I., Ed., and B. Thomas, Ed., "LDP Specification", RFC 5036, October 2007, and Rekhter, Y. and E. Rosen, "Carrying Label Information in BGP-4", RFC 3107, May 2001, the contents of each of which are incorporated herein by reference.

Routers 12 represent any network device that routes or otherwise forwards traffic through network 14 and that applies label swapping operations to the network traffic. Typically, routers 12 represent an L3 packet-switching device that operates at L3 to exchange routing information using a routing protocol, such as an Interior Gateway Protocol (IGP), describing a current topology of network 14. Routers 12 process this routing information, selecting paths through its representation of the topology of network 14 to reach all available destinations to generate forwarding information. In other words, routers 12 may reduce these paths to so-called "next hops" which identify interfaces to which to forward traffic destined for a particular destination, where the forwarding information includes this list of next hops. Routers 12 install the forwarding information in a forwarding plane of the respective router, whereupon the forwarding plane forwards received traffic in accordance with the forwarding information.

In the example of FIG. 1A, router 12A is an ingress router, router 12G is an egress router, and routers 12B-F are transit routers, i.e., intermediate routers, along LSPs 20 and 22. In some examples, routers 12A and 12G may be provider edge routers. Network administrators may use traffic-engineering in network 14 to guarantee characteristics, such as bandwidths of the LSPs 20 and 22. To do this, routers 12 may track and advertise, in the IGP update messages, the available bandwidth on each link. Routers 12 can then compute traffic-engineered paths through network 14 taking into account the available bandwidth, and when LSPs 20 and 22 are established, routers 12 adjust an amount of available bandwidth tracked for the various links 16 and 18.

LSPs 20A and 20A are higher priority LSPs that extend along paths that pass through routers 12B and 12C and links 16A-16C ("links 16"). LSP 22A is a lower priority LSP extends along a path that also passes through routers 12B and 12C and links 16. LSP 22B is a different lower priority LSP that extends along a path through routers 12D-12F and links 18A-18D ("links 18"). While LSPs 20 and 22 and describes as being "higher priority" and "lower priority," the priority of each may be relative to the priority of the other LSPs or relative to a predefined priority scale. For example, the priority values for each LSP may be in a range between 0 and 7. In some examples, a priority value of "0" indicates a highest possible priority while a priority value of "7" indicates a lowest possible priority value. In other examples, a priority value of "0" may indicate a lowest possible priority and "7" the highest possible priority. Moreover, an administrator of network 14 and/or routers 12 may configure a threshold priority value to differentiate between "lower priority" and "higher priority" LSPs (e.g., 2, 3, 4, 5, or any other number in the range of possible priority values).

As shown in FIG. 1A, routers 12 have previously computed and signaled LSPs 20 and 22, such as by using the Resource Reservation Protocol with Traffic Engineering extensions (RSVP-TE). Typically, when an LSP does not strict or loose hops or colors specified as constraints, the ingress router (i.e., router 12A) establishes the LSP over the shortest path to the destination so long as there is sufficient bandwidth available on each of the links along the path. Links along the shortest path are therefore more likely to be saturated (i.e., have less remaining bandwidth to reserve). Any low priority LSPs along such paths may suffer preemption when a higher priority LSP needs to be set up. LSP preemption occurs when a higher priority LSP is being set up and there is insufficient bandwidth on at least one link along the path for both the higher priority LSP and the lower priority LSP. In this situation, the lower priority LSP is "preempted" and is moved to a different path that does not include the saturated link so as to allow the higher priority LSP to be established along the path that does include the saturated link. If a higher priority LSP is removed from the path such that the saturated link once again has sufficient bandwidth for the lower priority LSP, the ingress router may move the lower priority LSP back onto the path with the saturated link. In this way, lower priority LSPs may be frequently moved between different paths when the lower priority LSPs are established on paths that included saturated links. Moving the lower priority LSPs back and forth requires additional network and router overhead to signal and determine the new path for the lower priority LSP. Frequent preemption may hinder the ability for a router to process packets (e.g., due to control plane overhead of repeated LSP preemption and setup) and negatively impact the traffic utilizing the lower priority LSP.

Routers 12 advertise the amount of available bandwidth on each of the links for each router 12 using IGP update messages. For example, router 12B monitors the available bandwidth on links 16A and 16B. If the change in the amount of bandwidth available for either link 16A or 16B changes by more than a threshold amount (e.g., 5%, 10%, 20%, etc.), router 12B generates an IGP update message that includes the amount of bandwidth available on one or more of links 16A and 16B. As one example, the IGP update message may indicate that link 16A has 20% of the total bandwidth of link 16A available and link 16B has 50% of the total bandwidth of link 16B available. Router 12B may be configured to specify how much bandwidth is available for each of the different LSP priority levels (e.g., 20% for priority 0, 10% for priority 4, and 0% for priority 7). In some examples, router 12B includes the actual amount of available bandwidth available on links 16A and 16B. In other examples, router 12B manipulates the amount of bandwidth available for lower priority LSPs (e.g., LSPs having a priority level of 7 or closer 7 than to 0) such that the, as the total bandwidth available on links 16A and/or 16B decreases, the bandwidth specified as being available for lower priority LSPs is less than the amount of bandwidth specified as being available for higher priority LSPs. For example, if the total amount of available bandwidth for link 16A is 20%, the IGP update message may indicate that 20% of the total bandwidth of link 16A is available for higher priority LSPs, but that there is no bandwidth available for lower priority LSPs on link 16A.

Ingress router 12A receives the IGP update messages and determines paths for LSPs based at least in part on the amount of available bandwidth for each link as specified in the IGP update messages. Rather than establishing a lower priority LSP on any path with sufficient bandwidth for the particular lower priority LSP, ingress router 12A is configured to establish the lower priority LSP on a path that is determined to be less likely to be preempted. For example, ingress router 12A may be configured to establish lower priority LSPs only along paths that include links having at least a threshold amount of bandwidth available. In the example shown in FIG. 1A, assume that LSPs 20A, 20B, and 22A are currently established and ingress router 12A is in the process of establishing LSP 22B, which is a lower priority LSP (e.g., an LSP with a priority value over 4, wherein a priority value of 0 indicates a highest priority). In this example, router 12A may determine that one of links 16 (e.g., link 16A) is becoming saturated by, for example, comparing an amount of advertised available bandwidth on link 16A to a threshold amount of available bandwidth required to be available in order to place a lower priority LSP on a path that includes link 16A.

In the examples where router 12B is configured to specify the actual amount of bandwidth available on link 16A in the IGP update messages, router 12A may analyze the IGP update message and determine the amount of the total bandwidth of link 16A that is available (i.e., not currently reserved by other LSPs). In accordance with techniques of this disclosure, router 12A is configured with an available bandwidth threshold such that lower priority LSPs cannot be placed on paths that include one or more links having less that the amount of available bandwidth required to satisfy the bandwidth threshold. As one example, router 12A is determining a path for lower priority LSP 22Bm determines that there is 19% of the total bandwidth of link 16A available for new LSPs, and is configured with a bandwidth threshold of 20%. In this example, router 12A will not establish lower priority LSP 22B along the path that includes link 16A because there is not sufficient available bandwidth on link 16A. Instead, router 12A analyzes the bandwidth available on links 18 and, in this example, determines that each of links 18 have sufficient bandwidth available. Accordingly, router 12A establishes lower priority LSP 22B along the path that includes routers 12D-F and links 18.

After setting up lower priority LSP 22B, router 12A may attempt to establish another LSP, such as higher priority LSP 20A. In such an instance, router 12A may determine that link 16A still has 19% of the total bandwidth of link 16A available and that links 16B and 16C have more than 20% of the total bandwidth of the respective links available. However, as higher priority LSP 20A is a higher priority LSP, router 12A is configured to refrain from applying the bandwidth threshold. Instead, router 12A may determine that link 16A has sufficient bandwidth for higher priority LSP 20A and establishes higher priority LSP 20A along the path that includes routers 12B-C and links 16.

In this manner, techniques of this disclosure may enable routers to control the paths of various LSPs so as to reduce the likelihood that lower priority LSPs are preempted. By selectively placing lower priority LSPs on paths in which all of the links have at least a threshold amount of available bandwidth, techniques of this disclosure may reduce the likelihood that a higher priority LSP placed along a path that includes any of the links of the lower priority LSP path will preempt the lower priority LSP. Reducing preemption of lower priority LSPs may decrease network resource utilization (e.g., router overhead, bandwidth utilized for establishing/moving LSPs, computing resources of the routers in the network, etc.)

Figure 1B:
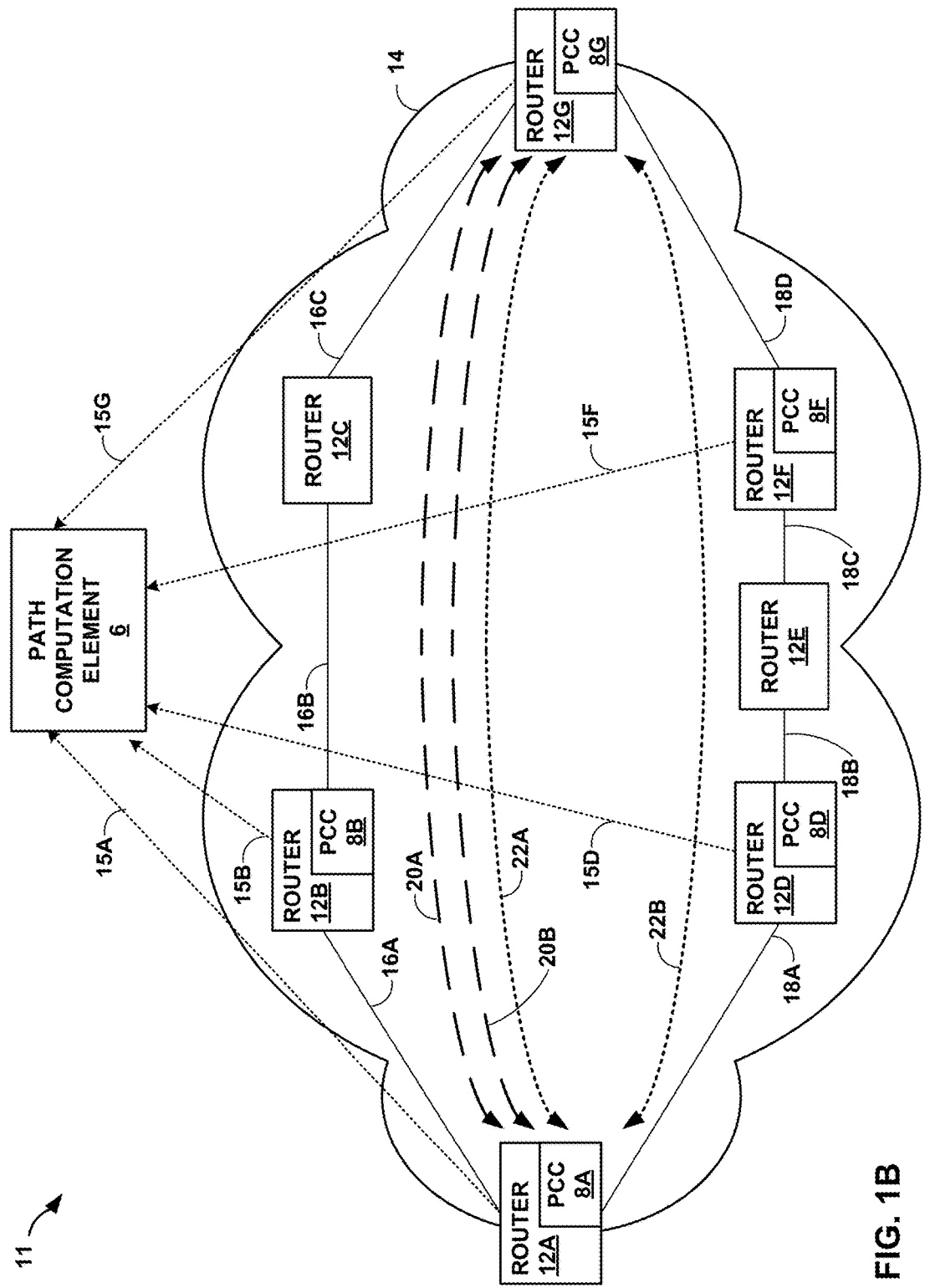

FIG. 1B is a block diagram illustrating an example network system 11 having higher priority LSPs 20 and lower priority LSPs 22 configured between ingress router 12A and egress router 12G, where path computation element (PCE) 6 controls LSPs 20 and 22 connecting routers 12 having path computation clients (PCCs), in accordance with techniques described herein. In this example, network system 11 includes PCE 6 and a plurality of routers 12 interconnected in the illustrated topology by network links. Routers 12 are members of a path computation domain served by PCE 6. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, multiple ASes that span multiple service provider networks. In various examples, different combinations of routers 4 may include member routers of multiple ASes. As such, network links connecting routers 4 may be interior links, inter-AS transport links, or some combination thereof. While illustrated and described with respect to routers, the techniques may be applicable to any network device that requests path computation and implements Multi-Protocol Label Switching (MPLS) or Generalized MPLS (GMPLS).

PCE 6 uses traffic engineering and LSP state information learned from routers 12 to apply constraints to compute network paths for MPLS traffic engineering LSPs (TE LSPs) both in response to requests from any of routers 12 and autonomously. PCE 6 is an application or other process executing on, for instance, a network node such as one of routers 12, a component of a network node, or an in-network or out-of-network server. To obtain traffic engineering information for storage in a traffic engineering database (not shown in FIG. 1), PCE 6 may execute one or more network routing protocols, extended to carry traffic engineering information, to listen for routing protocol advertisements that carry such traffic engineering information. PCE 6 computes paths for TE LSPs by applying bandwidth and other constraints to learned traffic engineering information. A resulting path may be confined to a single domain or may cross several domains.

Each of routers 12, other than routers 12C and 12E, includes one of path computation clients 8A-8G ("PCCs 8") that communicates using a corresponding one of extended PCE communication protocol (PCEP) sessions 15A-15G. Reference herein to a PCC may additionally refer to router or other network device that includes the PCC. Each of PCCs 8 is an application or other process executed by the router that establishes an extended PCEP session 15 with which to request path computation from PCE 6. An extended PCEP session 15 may operate over Transport Control Protocol (TCP) using a well-known port. Routers 12C and 12E may be a core router and is not, in this example, a label edge router (LER) that establishes LSPs and therefore does not include a path computation client. Instead, routers 12C and 12E are label switching routers (LSR).

PCEP provides a mechanism for PCCs 8 to issue to PCE 6 a path computation request for one or more TE LSPs. In other words, a typical PCE executing PCEP operates in a request/reply mode, where PCCs requests a computation and the PCE replies with a result. For each requested TE LSP, the path computation request may include a required bandwidth, a setup/holding priority, the source and destination network addresses, and a request priority. PCE 6 replies with a computed path for a requested TE LSP when the PCE 6 determines a path using the learned traffic information that satisfies the constraints. Upon receiving a response from PCE 6, routers 4 use a resource reservation protocol, such as Resource Reservation Protocol with Traffic Engineering extensions (RSVP-TE), to reserve resources along a computed path and establish TE LSPs to carry traffic mapped to the LSPs. Additional details regarding PCEP may be found in "Path Computation Element (PCE) Communication Protocol (PCEP)," Network Working Group, Request for Comment 5440, March 2009, the entire contents of which being incorporated by reference herein.

Extended PCEP sessions 12 support additional functionality to allow PCC 8 to synchronize LSP state information with PCE 6, delegate control over LSPs to PCE 6, and receive LSP modification requests from PCE 6 for delegated LSPs. This additional functionality provided by extended PCEP sessions 12 facilitates a stateful PCE 6 that maintains synchronization not only between PCE 6 and network system 11 topology and resource information, but also between PCE 6 and the set of computed paths and reserved resources in use in the network, as provided by PCCs 8 in the form of LSP state information. Not all of routers 12 need support the described techniques, and each router 12 may advertise to PCE 6 whether it supports the extended functionality described herein.

The synchronized LSP state information learned from PCCs 8 allows PCE 6 to optimize path computations. That is, PCC 8-specific LSP state information synchronization with PCE 6 may provide continually-updated and network-wide visibility on the part of PCE 6 of per-LSP state information and per-router 4 resource availability. This enhanced visibility may enable PCE 6 to improve resource demand placement among LSPs 20 and 22 headed by router 12A over that would otherwise be provided by router 12A computing paths and signaling LSPs 20 and 22 independently.

In some instances, the extended PCEP sessions 15 also allow PCE 6 to actively update LSP parameters in those PCCs 8 that have delegated control to PCE 6 over one or more LSPs headed by corresponding routers 12. The delegation and control techniques may, for example, allow PCE 6 to trigger LSP re-route, by an LSP head-end router such as any of routers 12, in order to improve LSP placement. In addition, LSP state injection using extended PCEP sessions 15 may further enable to PCE 6 to modify parameters of LSPs 20 and 22, including bandwidth and state, to synchronously coordinate demand placement, thereby permitting ordered control of path reservations across network routers.

In example network systems that include PCE 6, rather than ingress router 12A determining the path for new LSPs, PCE 6 may determine the path for the new LSPs. For example, PCE 6 may determine that one of links 16 (e.g., link 16A) is becoming saturated by, for example, comparing an amount of advertised available bandwidth on link 16A to a threshold amount of available bandwidth required to be available in order to place a lower priority LSP on a path that includes link 16A. PCE 6 is configured with an available bandwidth threshold such that lower priority LSPs cannot be placed on paths that include one or more links having less that the amount of available bandwidth required to satisfy the bandwidth threshold. That is, rather than establishing a lower priority LSP on any path with sufficient bandwidth for the particular lower priority LSP, PCE 6 is configured to establish the lower priority LSP on a path that is determined to be less likely to be preempted.

As one example, PCE 6 is determining a path for lower priority LSP 22Bm determines that there is 19% of the total bandwidth of link 16A available for new LSPs, and is configured with a bandwidth threshold of 20%. In this example, PCE 6 will not establish lower priority LSP 22B along the path that includes link 16A because there is not sufficient available bandwidth on link 16A. Instead, PCE 6 analyzes the bandwidth available on links 18 and, in this example, determines that each of links 18 have sufficient bandwidth available. Accordingly, PCE 6 establishes lower priority LSP 22B along the path that includes routers 12D-F and links 18.

After setting up lower priority LSP 22B, PCE 6 may attempt to establish another LSP, such as higher priority LSP 20A. In such an instance, PCE 6 may determine that link 16A still has 19% of the total bandwidth of link 16A available and that links 16B and 16C have more than 20% of the total bandwidth of the respective links available. However, as higher priority LSP 20A is a higher priority LSP, PCE 6 is configured to refrain from applying the bandwidth threshold. Instead, PCE 6 may determine that link 16A has sufficient bandwidth for higher priority LSP 20A and establishes higher priority LSP 20A along the path that includes routers 12B-C and links 16.

Figure 2:
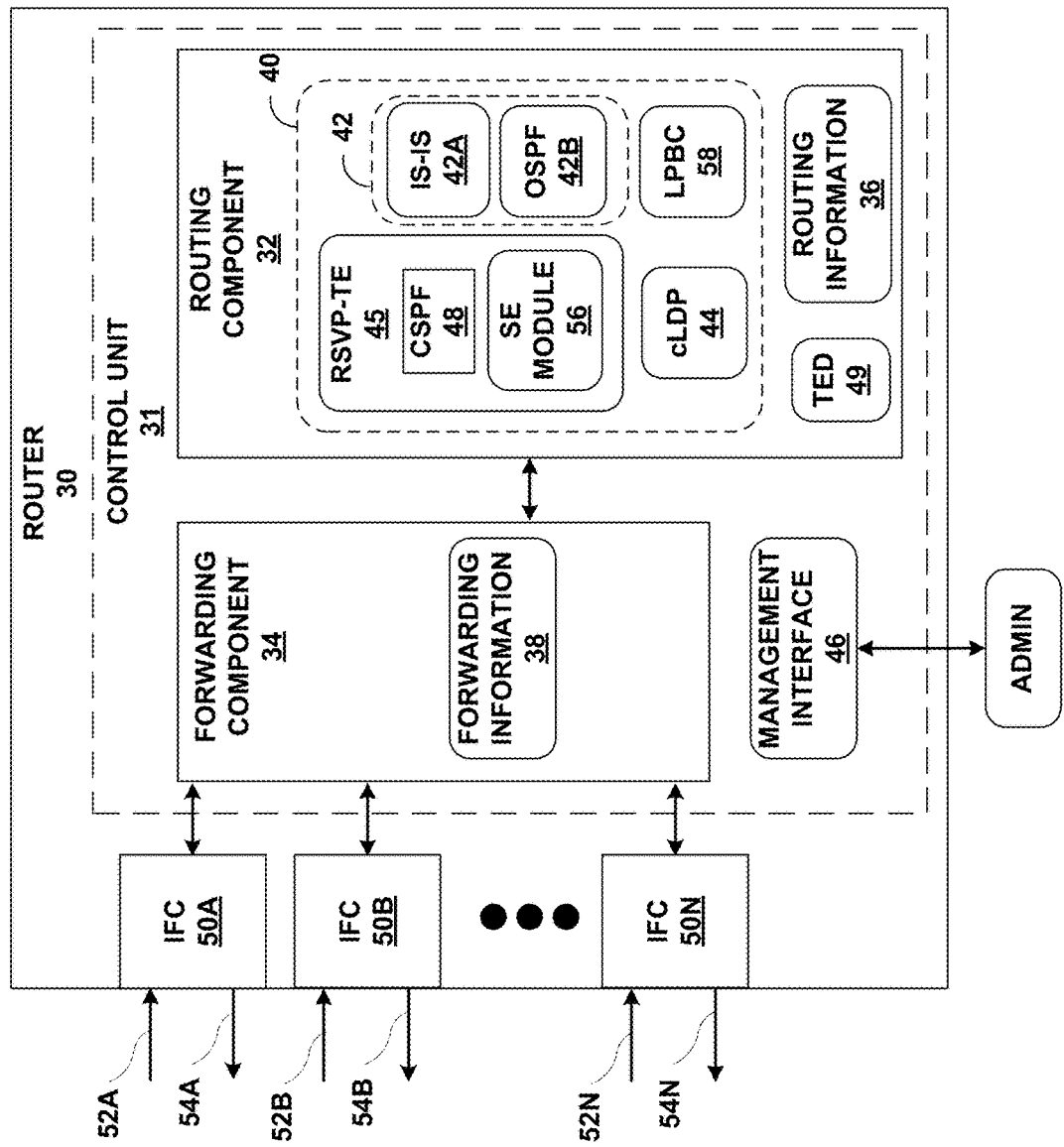
FIG. 2 is a block diagram illustrating an exemplary router that adjusts available bandwidth to influence path selection for lower priority LSPs in accordance with one or more techniques of this disclosure.

FIG. 2 is a block diagram illustrating an example an exemplary router 30 that adjusts available bandwidth to influence path selection for lower priority LSPs in accordance with one or more techniques of this disclosure. Router 30 may, for example, represent any of routers 12 of FIG. 1A or 1B. In this example, router 30 includes a control unit 31 that comprises a routing component 32 and a forwarding component 34. In addition, router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing component 32 primarily provides an operating environment for control plane protocols 40. For example, one or more IGP routing protocols 42, such as Intermediate System to Intermediate System (ISIS) routing protocol 42A, or the Open Shortest Path First (OSPF) routing protocol 42B, maintain routing information 36 to reflect the current topology of a network and other network entities to which router 30 is connected. In particular, IGPs 42 update routing information 36 to accurately reflect the topology of the network and other entities. Router 30 may include other example routing protocols such as Border Gateway Protocol (BGP).

Routing component 32 generates and programs forwarding component 34 with forwarding information 38 that associates network destinations with specific next hops and corresponding interfaces ports of IFCs 50 in accordance with routing information 36. Routing component 32 may generate forwarding information 38 in the form of a radix tree having leaf nodes that represent destinations within the network, for example.

Based on forwarding information 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, optionally distributed over a multi-chassis router. Moreover, forwarding component 34 may be provided by dedicated forwarding integrated circuits normally associated with high-end routing components of a network router. Further details of one example embodiment of router 30 can be found in U.S. Pat. No. 8,339,939, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

As shown in FIG. 2, protocols 40 executing within routing component 32 includes one or more MPLS protocols for establishing a LSP, which may be accumulated by IGPs 42. For example, RSVP-TE 45 may generate and maintain a traffic engineering database 49, including bandwidth reservations for paths associated with MPLS LSPs. Constrained Shortest Path First (CSPF) process 61 computes a shortest path or paths for an MPLS LSP based on specified constraints and bandwidth availability information associated with the links within the network. IGPs 42 may, in turn, advertise the calculated bandwidth availability information in traffic engineering database (TED) 49 to other peer routers. As another example, constrained Label Distribution Protocol (cLDP) 44 may send and receive label mapping messages for establishing a LSP.

In addition, routing component 32 includes a LSP priority bandwidth constraint (LPBC) module 58 that operates to selectively place lower priority LSPs on paths having at least a threshold amount of available bandwidth. The manner in which LPBC module 58 operates may change based on how the techniques of this disclosure are implemented in network 14. For example, in a "transit" based approach, a management tool or script monitors the remaining bandwidth on all of the links in network 14 (e.g., links 16 and 18) by, for example, querying routers 12 using management interface 46. When the amount of available bandwidth for a link fall below a threshold amount, LPBC module 58 may set the bandwidth subscription percentage for lower priority LSPs on that link to a value such that future lower priority LSPs are not placed on paths that include that particular link (e.g., in examples where router 30 is an ingress router).

When operating as a transit router such as router 12B, router 30 receives RSVP-TE PATH messages from ingress router 12A for setting up LSPs 22A and 22B, respectively. In response, RSVP-TE module 45 of router 30 forwards the RSVP-TE PATH messages to router 16B, and also sends RSVP-TE RESV messages back to the ingress routers confirming the reservation of the requested bandwidth. RSVP-TE module 45 may also inform IGPs 42, which in turn can update TED 49 with current available bandwidth information. IGPs 42 may also forward the updated current available bandwidth information to other IGP peers. In some cases, IGPs 42 may not perform an IGP update for small changes in bandwidth, and router 30 may be configured with a threshold bandwidth amount that IGPs 42 use to determine when to perform an IGP update. In some examples, IGPs 42 may be configured to perform an IGP update for larger changes in bandwidth when there is a large amount of available bandwidth (e.g., a 10%, 15%, 20%, etc. change in bandwidth when there is more than 30%, 40%, 50%, etc. of bandwidth available) and to perform an IGP update for smaller changes in bandwidth when there is a small amount of available bandwidth (e.g., a 1%, 2%, 5%, etc. change in bandwidth when there is less than 30%, 20%, 10%, 5%, etc. of bandwidth available). RSVP-TE module 45 may also store MPLS labels to forwarding information 38 for LSPs 22A and 22B.

As additional LSPs are places on links 52 and 54 of router 30, IGPs 42 continue to monitor the increased bandwidth usage of the links and selectively perform IGP updates. In some examples, LPBC module 58 may exchange messages with IGPs 42 to alter the amount of bandwidth that appears to be available for lower priority LSPs to IGPs 42. For example, LPBC module 58 may be configured to perform a procedure to set per priority bandwidth subscription on congested links (i.e., "hot" links). For each link on router 30, LPBC module 58 monitors the available bandwidth and, when the remaining, unreserved, bandwidth at the higher priority (e.g., priority "0") on the link falls below a threshold percentage (e.g., 20%), the procedure is triggered. For priorities below a configured priority threshold (e.g., priorities greater than any of 0-6 where the priority range is 0-7 and 0 is the highest priority), change the amount of available bandwidth reported in the IGP update message by a configured amount (e.g., the same amount as the threshold percentage, a smaller amount, or a larger amount).

For example, if the amount of available bandwidth drops to 15% on a link (e.g., link 54B), LPBC module 58 compares the current amount of available bandwidth on the link (i.e., 15% in this example) to the threshold amount of remaining bandwidth (e.g., 20%). Responsive to determining that the amount of remaining bandwidth is less than the threshold amount, LPBC module 58 alters the amount of bandwidth indicated as being available for LSPs having a priority lower than the threshold priority. That is, in response to determining that the amount of remaining bandwidth does not satisfy the threshold bandwidth, LPBC module 58 may cause IGPs 42 to perform an IGP update that sets priority subscriptions on the link such that, for lower priority LSPs, there appears to be no bandwidth available while, for higher priority LSPs, there appears to be the full 15% of remaining bandwidth available.

One or more LSPs may be removed from the link such that the amount of available bandwidth increases to an amount greater than the threshold amount of remaining bandwidth (e.g., 21% where the threshold is 20%). In such instances, LPBC module 58 may not automatically change priority subscriptions. Instead, LPBC module 58 may apply a second threshold amount of available bandwidth, which may be different from the first threshold used to trigger the priority subscriptions. The second threshold amount may be the same as or greater than the first threshold. In some examples, the second threshold may be 30% whereas the first threshold is 20%. In such examples, LPBC module 58 will continue to cause IGPs 42 to perform IGP updates that indicate there is no available bandwidth on the congest link so long as the amount of available bandwidth is less than the second threshold (i.e., less than 30%).

In such a "transit" based approach, the management tool, rather than the ingress router, queries each transit router to find the remaining bandwidth on the link. Thus, this approach doesn't rely on IGP updates to determine when a link becomes congested or ceases to be congested. As such, this approach works even when the change in bandwidth usage leading to toggling of links' congested state is less than the IGP update threshold percentage. Moreover, when per bandwidth subscription is set, an IGP update is triggered and this enables all routers 12 to avoid placing lower priority LSPs on the given link.

Techniques of this disclosure may also be implemented using an "ingress" based approach. In an example "ingress" based approach, router 30 is an ingress router, LPBC module 58 monitors all links in TED 49 and, when the remaining bandwidth for higher priority LSPs for any link fall below a threshold amount of available bandwidth, LPBC 58 may alter how much bandwidth appears to be available on the congested link to protocols 40 (e.g., by making it appear that there is less bandwidth available for lower priority LSPs on the congested link than there actually is while maintaining the amount of available bandwidth for higher priority LSPs) such that routing protocols 40 establish new lower priority LSPs on paths that do not include the congested link.

When operating as an ingress router such as router 12A, router 30 receives periodic IGP update messages from routers 12. The IGP update messages include an indication of the amount of available bandwidth on each of links 16 and 18. LPBC module 58 is configured with an available bandwidth threshold, an LSP priority threshold, a subscription percent, and an IGP update threshold. For each link TED 49, LPBC module 58 determines whether the available bandwidth satisfies the available bandwidth threshold. If the available bandwidth for a particular link (e.g., link 52N) does not satisfy the available bandwidth threshold, LPBC module 58 determines that the available bandwidth for the link needs to be adjusted within TED 49. For example, LPBC module 58 may alter the amount of available bandwidth on the link and for a range of LSP priorities within TED 49. The range of LSP priority that will be subject to the bandwidth adjustment are those priorities that satisfy the LSP priority threshold. For example, if the priority threshold is 3 where the priority range is 0-7 with 0 being the higher priority, LPBC module 58 adjusts the available bandwidth for priorities 4-7 or 3-7, depending if LPBC module 58 is configured to specify the range as being exclusive of (e.g., greater than) or inclusive of (e.g., greater than or equal to) the priority threshold. LPBC module 58 adjusts the available bandwidth by the subscription percent. That is, within TED 49, LPBC module 58 reduces the amount of bandwidth indicated as available for LSPs within the range of priorities by the subscription percent. When IGPs 42 establish a new LSP, RSVP-TE 45 queries TED 49 and, if the priority of the new LSP is within the priority range having the adjusted available bandwidth values, RSVP-TE 45 will not establish the new LSP over the link.

If the remaining bandwidth percentage for the highest priority LSPs is above the bandwidth threshold of the total link capacity by at least the IGP update threshold of the link's capacity, then LPBC module 58 may revert the available bandwidth for the priority range and, instead, set the available bandwidth to the actual values indicated from the IGP update messages. However, in such instances, LPBC module 58 may not automatically update TED 49 with the actual values from the IGP update messages. Instead, LPBC module 58 may apply a second threshold amount of available bandwidth, which may be different from the first threshold used to trigger the priority subscriptions. The second threshold amount may be the same as or greater than the first threshold. In some examples, the second threshold may be 30% whereas the first threshold is 20%. In such examples, LPBC module 58 will continue to refrain from updating TED 49 with the actual values so long as the amount of available bandwidth is less than the second threshold (i.e., less than 30%).

By implementing this "ingress" based approach, only the ingress routers need to be configured in accordance with the techniques of this disclosure while the transit and egress routers may operate in a conventional manner. Moreover, if owing to the local instrumented view obtained by applying subscription, a certain low priority LSP is not coming up after multiple retries, then the ingress router may be configured to relax the subscription and try to bring up the low priority LSP.

While described above with respect to a single link, techniques of this disclosure may also be applied to bundled links, which are two or more links that are bundled together such that the two or more links are viewed as a single link. As examples, the bundled link may be an aggregated Ethernet link, and aggregated SONET link, or other aggregated, bundled link. Routers 12, when signaling and provisioning LSPs 20 and 22, may utilize a total bandwidth provided by the aggregate link.

When a member link is removed from an aggregate link bundle, it is likely to create some congestion on the aggregate link. Thus, before removing the member link, LPBC module 58 may be configured to set the subscription (i.e., the amount of bandwidth available) for low priority LSPs such that the remaining bandwidth is utilized by higher priority LSPs. When a member link is added to an aggregate link bundle that is currently congested, the addition may result in an immediate spike in the available bandwidth. This spike in available bandwidth may attract LSPs waiting to be setup (including any lower priority LSPs). As such, LPBC module 58 may set the subscription for low priority LSPs before adding the member link, thereby potentially avoiding the situation of low priority LSPs getting placed on the new member link given that the aggregate link is on a congested path.

Similarly, when a particular link or router is to be taken down for maintenance, router 30 generally reroutes the traffic along other paths, which may cause congestion along those paths owing to the extra load from the path under maintenance. If the alternate paths can be identified in advance, LPBC module 58 can set the subscription on those links to limit the lower priority LSPs on those paths.

In network 14, LPBC module 58 may be configured to set up an admission control behavior that differentiates between the LSPs based on their priority, overriding actual bandwidth availability at the priority. One approach is to start with a behavior where there is no differentiation based on priorities. That is, when new links are added LPBC module 58 does not adjust the available bandwidth for the new links, whether through changes to TED 49 or the bandwidth advertised in IGP update messages. In this approach, the lower priority LSPs are denied portion of the total capacity when links become congested, as discussed above. Another approach is for LPBC module 58 to adjust the available bandwidth advertised for new links so as to deny bandwidth for lower priority LSPs on any link that comes up. Once the link is up, LPBC module 58 may be configured to gradually increase the amount available bandwidth for low priority LSPs. Each time a lower priority LSP is preempted, LPBC module 58 may reduce the gradual increase in available bandwidth for low priority LSPs.

Figure 3:
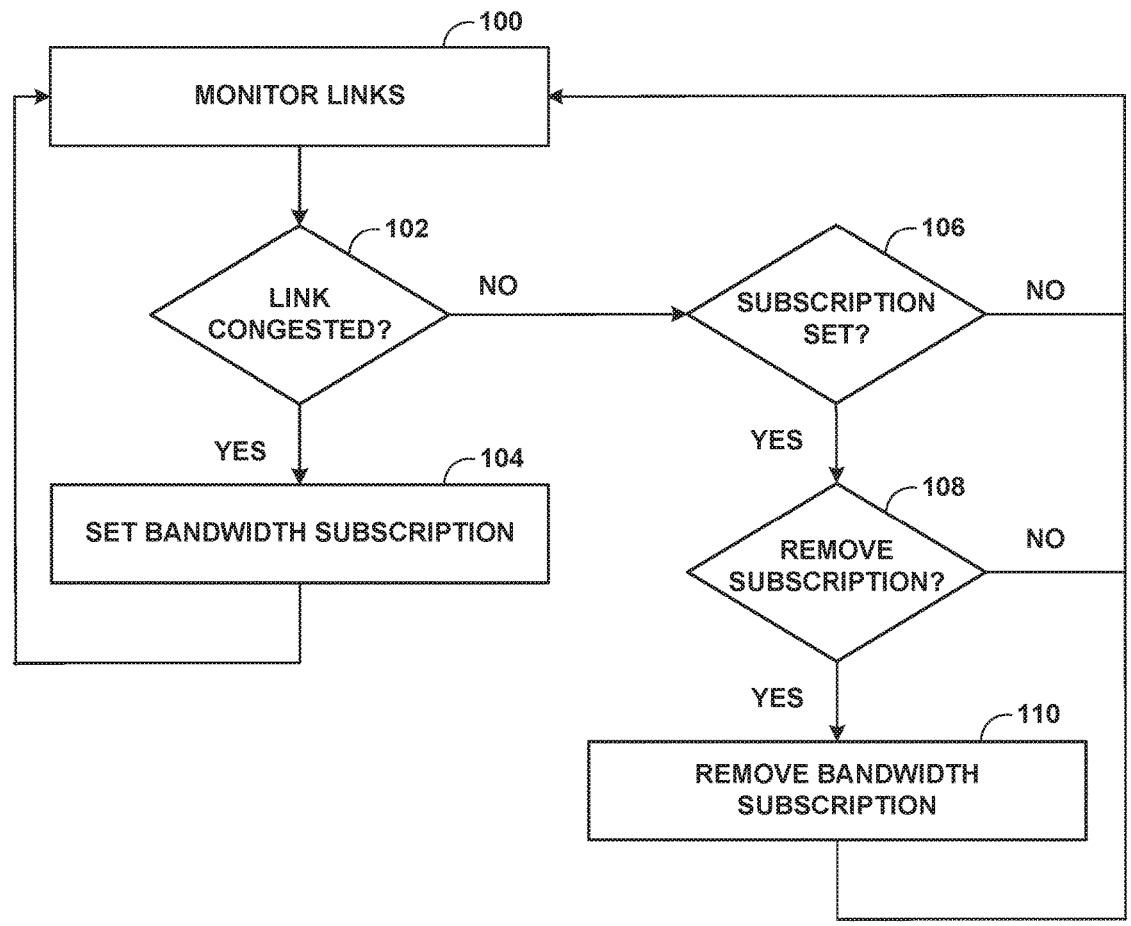
FIG. 3 is a flowchart illustrating example operation of a network device in accordance with one or more techniques of this disclosure.

FIG. 3 is a flowchart illustrating example operation of a network device, such as a router, in accordance with the techniques described herein. The example operation of FIG. 3 is described with respect to example network system 10 of FIG. 1A and router 30 of FIG. 2.

Whether implementing the techniques of this disclosure using the "transit" approach or the "ingress" approach, router 30 monitors the bandwidth usage of various network links (100). In the "transit" approach, a management application queries router 30 (e.g., via management interface 46) to retrieve information about the available bandwidth on each of the links coupled to router 30 (e.g., links 52 and 54). Router 30 provides the amount bandwidth usage for each of links 52 and 54 to the management application. In the "ingress" approach, LPBC module 58 of router 30 monitors the amount of available bandwidth on other the links within network 14 (e.g., links 16 and 18) in addition to those coupled to router 30. In this approach, router 30 receives IGP update messages from other routers in network 14 and updates TED 49 with the amount of available bandwidth specified in the IGP update messages.

Router 30 determines if one of the links is congested (102). In the "transit" approach, router 30 may receive an indication that the link is congested from the management tool. In the "ingress" approach, router 30 compares the amount of available bandwidth to an available bandwidth threshold. The available bandwidth threshold may be configured by an administrator and may be set to any value, such as 50%, 30%, 20%, 10%, etc. In one example, the available bandwidth threshold is set to 30%. In such an example, LPBC module 58 compares the amount of available bandwidth of each link to the 30% available bandwidth threshold and, for any links having less than 30% (or, in some examples, less than or equal to 30%) of bandwidth available, determines that the links are congested links ("YES" branch of 102). In general, if the amount of available bandwidth for a particular link satisfies the available bandwidth threshold, LPBC module 58 determines that there is sufficient bandwidth available on the link and that the particular link is not congested ("NO" branch of 102).

In instances where LPBC module 58 determines that the link is congested ("YES" branch of 102), LPBC module 58 sets the bandwidth subscription for the link (104). When router 30 is using the "transit" approach, in order to set the bandwidth subscription for the congested link coupled to router 30, LPBC module 58 adjusts the current amount of bandwidth available on the congested link for lower priority LSPs such that there is less available bandwidth for lower priority LSPs than for higher priority LSPs. For example, LPBC module 58 may cause IGPs 42 to perform an IGP update where the IGP update message includes an indication that the amount of available bandwidth for LSPs having a priority lower than a configured priority threshold is zero. While stated as being of "lower" and "higher" priority, depending on the prioritization scheme utilized by routers 12, the actual value of the priority designation may be a higher integer value or a lower integer value. For example, if the priority scale is 0-7, 0 could indicate the lowest priority or 0 could indicate the highest priority. Regardless. The value on the opposite end of the range from the value indicative of the highest priority is a value that indicates a lower priority.

In instances where router 30 implements the "ingress" approach, LPBC module 58 sets the bandwidth subscriptions by at least adjusting TED 49 to indicate the reduced amount of bandwidth available for lower priority LSPs. That is, LPBC module 58 may alter the amount of available bandwidth for lower priority LSPs such that, when a new LSP is established in network 14, IGPs 42 query TED 49 for the available bandwidth on each of links 12 and 16 in network 14 and may receive different bandwidth values for different LSP priorities.

If router 30 determines that the link is not congested ("NO" branch of 102), LPBC module 58 may determine if there is currently a subscription set on the link (106). That is, LPBC module 58 may determine if TED 49 includes different available bandwidth values for different LSP priorities for the link. If there is no subscription set on the link ("NO" branch of 106), router 30 continues to monitor the links (100).

If there is a subscription set on the link ("YES" branch of 106), LPBC module 58 determines whether or not to remove the subscription (108). In some instances, LPBC module 58 is configured with a subscription removal threshold such that LPBC module 58 determines whether to remove the bandwidth subscription based on a comparison between the current amount of available bandwidth on the link to the subscription removal threshold. The subscription removal threshold may be any value that is equal to or greater than the available bandwidth threshold. For example, if the available bandwidth threshold is 30% as specified in the example above, the subscription removal threshold may be 30%, 40%, 50%, etc. LPBC module 58 is configured such that the subscription is removed in response to determining that the current available bandwidth for the higher priority LSPs satisfies the subscription removal threshold (e.g., is greater than the subscription removal threshold or greater than or equal to the subscription removal threshold).

If the amount of available bandwidth on the link does not satisfy the subscription removal threshold, LPBC module 58 determines not to remove the subscription from the link ("NO" branch of 108) and router 30 continues to monitor the links (100). If the amount of available bandwidth on the link satisfies the subscription removal threshold, LPBC module 58 determines to remove the subscription from the link ("YES" branch of 108) and removes the subscription (110). In order to remove the subscription in examples where router 30 is implementing the "transit" approach, LPBC module 58 updates TED 49 to indicate that all of the LSP priority levels for the link have the full amount of available bandwidth on the link (i.e., the highest priority LSP has the same amount of available bandwidth as the lowest priority LSP) and triggers IGPs 42 to perform an IGP update such that the IGP update messages sent by router 30 indicate that all LSP priorities have the same amount of available bandwidth. In order to remove the subscription in examples where router 30 is implementing the "ingress" approach, LPBC module 58 updates TED 49 to indicate that all of the LSP priority levels for the link have the full amount of available bandwidth on the link (i.e., the highest priority LSP has the same amount of available bandwidth as the lowest priority LSP) such that, when IGPs 42 initiate setup of a new LSP, IGPs 42 query TED 49 and determine that lower priority LSPs have the same amount of available bandwidth as higher priority LSPs.

While removing the subscription is described as configuring the amount of available bandwidth such that the lower priority LSPs have the same amount of available bandwidth as higher priority LSPs, in some examples, rather than fully removing the subscription, LPBC module 58 may partially remove the subscription. For example, router 30 may be configured with multiple subscription removal thresholds such that as the amount of available bandwidth on the link increases, the amount of bandwidth made available for lower priority LSPs also increases. At some amount of available bandwidth (e.g., 100% available bandwidth), the lower priority LSPs may be configured to have the same amount of available bandwidth as the higher priority LSPs.

Figure 4:
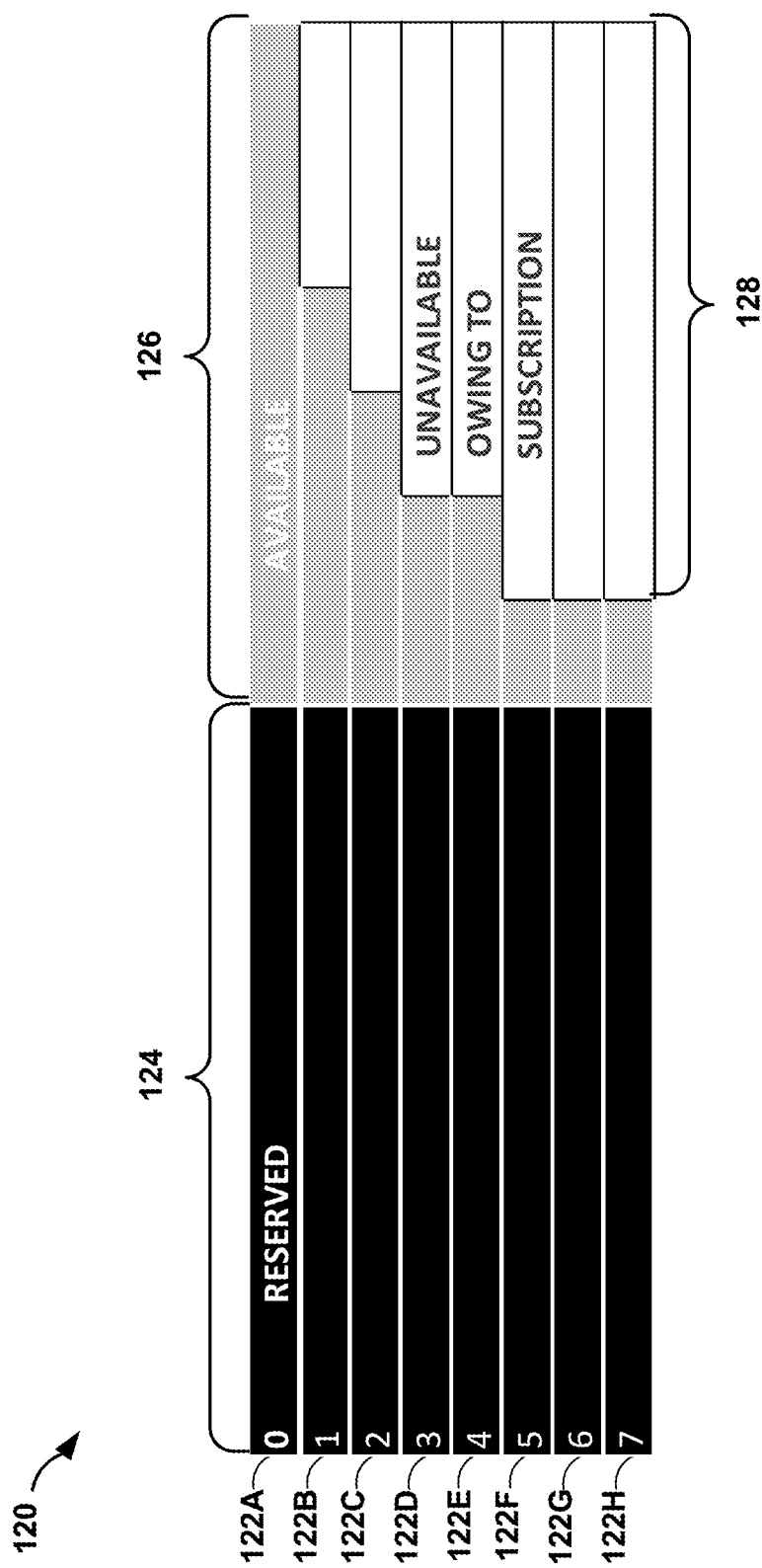
FIG. 4 is a conceptual diagram illustrating an example subscription bandwidth distribution across different LSP priorities, in accordance with one or more techniques of this disclosure.

FIG. 4 is a conceptual diagram illustrating an example subscription bandwidth distribution across different LSP priorities, in accordance with one or more techniques of this disclosure. In the example of FIG. 4, table 120 includes bandwidth availability for LSPs having priorities 122A-122H, within a range from 0-7, inclusive, for a particular link (e.g., link 16A of FIG. 1A), where priority "0" represents the highest priority for an LSP and priority "7" represents the lowest priority for an LSP. For the particular link, reserved bandwidth 124 represents the amount of bandwidth currently reserved by one or more LSPs currently established on the link. Available bandwidth 126 (shaded grey) represents the amount of bandwidth available for other LSPs having the respective priority level. For example, for priority level 122A (i.e., the highest priority LSP), all of the bandwidth not currently reserved is available for new LSPs having priority level 122A. However, as shown in FIG. 4, for other priority levels (e.g., priority level 122D), only a portion of the bandwidth not currently reserved is available for new LSPs having priority level 122D. Reserved available bandwidth 128 represents the amount of available bandwidth withheld from being used for the lower priority LSPs (e.g., priorities other than 122A). Thus, as shown in FIG. 4, the techniques of this disclosure may be applied to different LSP priority levels such that each different possible LSP priority level may be associated with a corresponding available bandwidth threshold and each possible priority level may be configured with a respective bandwidth subscription.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the invention have been described. These and other embodiments are within the scope of the following claims.

What is claimed is:

1. A method comprising:
   determining, by a router, whether a link is congested based at least in part on an amount of available bandwidth on the link; and
   responsive to determining that the link is congested:
      setting, by the router, a bandwidth subscription for the link, wherein the bandwidth subscription specifies a respective amount of bandwidth available for each different label switched path priority level from a plurality of different label switched path priority levels such that the amount of available bandwidth on the link for label switched paths having priority levels that satisfy a lower priority level threshold is less than an amount of available bandwidth on the link and less than the amount of available bandwidth on the link for label switched paths having priority levels that do not satisfy the lower priority level threshold; and
responsive to setting the bandwidth subscription, sending, by the router and to at least one other router in a network, an indication that a first amount of bandwidth is available for the label switched paths having priority levels that satisfy the lower priority level threshold and that a second amount of bandwidth is available for the label switched paths having priority levels that do not satisfy the lower priority level threshold, wherein the first amount of bandwidth is less than the second amount of bandwidth, and wherein the first amount of bandwidth is less than the amount of available bandwidth on the link.

2. The method of claim 1, wherein setting the bandwidth subscription comprises:
initiating, by the router, an interior gateway protocol update; and
generating, by the router, an interior gateway protocol update message indicating that the amount of available bandwidth on the link for label switched paths having the priority levels that satisfy the lower priority level threshold is less than the amount of available bandwidth on the link for label switched paths having the priority levels that do not satisfy the lower priority level threshold,
wherein sending the indication to the at least one other router in the network comprises sending, by the router, the interior gateway protocol update message to the at least one other router in the network.

3. The method of claim 1, wherein determining whether the link is congested further comprises:
receiving, by the router and from a management tool, a request for the amount of available bandwidth on the link, wherein the link is coupled to the router;
sending, by the router and to the management tool, the amount of available bandwidth on the link;
receiving, by the router and from the management tool, an indication of whether the link is congested; and
determining, by the router, whether the link is congested based on the indication of whether the link is congested.

4. The method of claim 1, further comprising:
after determining that the link is congested and responsive to determining, by the router, that the link is no longer congested, determining whether the bandwidth subscription for the link is set; and
responsive to determining that the bandwidth subscription for the link is set, selectively removing the bandwidth subscription for the link.

5. The method of claim 4, wherein selectively removing the bandwidth subscription from the link comprises:
determining, by the router, whether the amount of available bandwidth on the link satisfies a subscription removal threshold;
responsive to determining that the amount of available bandwidth on the link satisfies the subscription removal threshold, removing, by the router, the bandwidth subscription; and
responsive to determining that the amount of available bandwidth on the link does not satisfy the subscription removal threshold, maintaining the bandwidth subscription.

6. The method of claim 4, wherein removing the bandwidth subscription for the link comprises updating, by the router, a traffic engineering database of the router to indicate that the amount of available bandwidth on the link for label switched paths having the priority levels that satisfies the lower priority level threshold is the same as the amount of available bandwidth on the link for label switched paths having the priority levels that does not satisfy the lower priority level threshold.

7. The method of claim 6, wherein removing the bandwidth subscription for the link further comprises:
initiating, by the router, an interior gateway protocol update;
generating, by the router, an interior gateway protocol update message indicating that the amount of available bandwidth on the link for label switched paths having priority levels that satisfy the lower priority level threshold is the same as the amount of available bandwidth on the link for label switched paths having priority levels that do not satisfy the lower priority level threshold; and
sending, by the router, the interior gateway protocol update message to at least one other router in a network.

8. The method of claim 1, wherein determining whether the link is congested comprises determining whether the amount of available bandwidth on the link satisfies an available bandwidth threshold.

9. The method of claim 8, further comprising:
receiving, by the router, an interior gateway protocol update message from a different router in a network, wherein the interior gateway protocol update message specifies the amount of available bandwidth on the link;
updating, by the router, a traffic engineering database of the router with the amount of available bandwidth on the link; and
determining, by the router, the amount of available bandwidth on the link by at least querying the traffic engineering database for the amount of available bandwidth on the link.

10. The method of claim 1, wherein setting the bandwidth subscription for the link comprises:
updating, by the router, a traffic engineering database of the router to indicate that the amount of available bandwidth on the link for label switched paths having the priority levels that satisfy the lower priority level threshold is less than the amount of available bandwidth on the link for label switched paths having the priority levels that do not satisfy the lower priority level threshold.

11. A router comprising:
a plurality of physical interfaces each having at least one link interconnecting the router as one of a plurality of routers in a network; and
a processor configured to determine whether a link of a physical interface of the plurality of physical interfaces is congested based at least in part on an amount of available bandwidth on the link, and, responsive to determining that the link is congested, set a bandwidth subscription for the link, wherein the bandwidth subscription specifies a respective amount of bandwidth available for each different label switched path priority level from a plurality of different label switched path priority levels such that the amount of available bandwidth on the link for label switched paths having priority levels that satisfy a lower priority level threshold is less than an amount of available bandwidth on the link and less than the amount of available bandwidth on the link for label switched paths having priority levels that do not satisfy the lower priority level threshold.

12. The router of claim 11, wherein the processor is configured to set the bandwidth subscription by at least being configured to execute an interior gateway protocol update, generate an interior gateway protocol update message indicating that the amount of available bandwidth on the link for label switched paths having the priority levels that satisfy a lower priority level threshold is less than the amount of available bandwidth on the link for label switched paths having priority levels that do not satisfy the lower priority level threshold, and send the interior gateway protocol update message to at least one other router of the plurality of routers in the network.

13. The router of claim 11, further comprising:
a computer-readable storage medium configured to store a traffic engineering database,
wherein the processor is configured to receive a request for the amount of available bandwidth on the link, wherein the link is coupled to the router, query the traffic engineering database for the amount of available bandwidth on the link, send the amount of available bandwidth on the link, receive an indication of whether the link is congested, and determine whether the link is congested based on the indication of whether the link is congested.

14. The router of claim 11, wherein the processor is configured to, responsive to determining that the link is not congested, determine whether the bandwidth subscription for the link is set, and, responsive to determining that the bandwidth subscription for the link is set, selectively remove the bandwidth subscription for the link.

15. The router of claim 11, wherein the processor is configured to selectively remove the bandwidth subscription by at least being configured to determine whether the amount of available bandwidth on the link satisfies a subscription removal threshold, responsive to determining that the amount of available bandwidth on the link satisfies the subscription removal threshold, remove the bandwidth subscription, and, responsive to determining that the amount of available bandwidth on the link does not satisfy the subscription removal threshold, maintain the bandwidth subscription.

16. The router of claim 11, wherein the processor is configured to determine whether the link is congested by at least being configured to determine whether the amount of available bandwidth on the link satisfies an available bandwidth threshold.

17. The router of claim 16, further comprising:
a computer-readable storage medium configured to store a traffic engineering database,
wherein the processor is configured to receive an interior gateway protocol update message from a different one of the plurality of routers in the network, wherein the interior gateway protocol update message specifies the amount of available bandwidth on the link, update the traffic engineering database with the amount of available bandwidth on the link, and determine the amount of available bandwidth on the link by at least querying the traffic engineering database for the amount of available bandwidth on the link.

18. A computer-readable storage device storing instructions that cause a processor to:
determine whether a link is congested based at least in part on an amount of available bandwidth on the link;
responsive to determining that the link is congested, set a bandwidth subscription for the link, wherein the bandwidth subscription specifies a respective amount of bandwidth available for each different label switched path priority level from a plurality of different label switched path priority levels such that the amount of available bandwidth on the link for label switched paths having priority levels that satisfy a lower priority level threshold is less than an amount of available bandwidth on the link and less than the amount of available bandwidth on the link for label switched paths having priority levels that do not satisfy the lower priority level threshold; and
send, to at least one other router in a network, an indication that a first amount of bandwidth is available for the label switched paths having priority levels that satisfy the lower priority level threshold and that a second amount of bandwidth is available for the label switched paths having priority levels that do not satisfy the lower priority level threshold, wherein the first amount of bandwidth is less than the second amount of bandwidth, and wherein the first amount of bandwidth is less than the amount of available bandwidth on the link.

19. The computer-readable storage device of claim 18,
wherein the instructions further cause the processor to set the bandwidth subscription by at least causing the processor to generate an interior gateway protocol update message indicating that the amount of available bandwidth on the link for label switched paths having the priority levels that satisfy a lower priority level threshold is less than the amount of available bandwidth on the link for label switched paths having priority levels that do not satisfy the lower priority level threshold, and
wherein the instructions further cause the processor to send the indication by at least causing the processor to send the interior gateway protocol update message to at least one other router in a network.

20. The computer-readable storage device of claim 18, wherein the instructions further cause the processor to:
receive an interior gateway protocol update message from a different one of the plurality of routers in the network, wherein the interior gateway protocol update message specifies the amount of available bandwidth on the link;
update a traffic engineering database of the router with the amount of available bandwidth on the link;
determine the amount of available bandwidth on the link by at least querying the traffic engineering database for the amount of available bandwidth on the link; and
determine whether the link is congested by at least determining whether the amount of available bandwidth on the link satisfies an available bandwidth threshold.

* * * * *